(12) United States Patent
Zhao

(10) Patent No.: US 9,766,513 B2
(45) Date of Patent: Sep. 19, 2017

(54) PIXEL ARRAY STRUCTURE AND LIQUID CRYSTAL DISPLAY PANEL

(71) Applicant: Shenzhen China Star Optoelectronics Technology Co., Ltd., Shenzhen, Guangdong (CN)

(72) Inventor: Yang Zhao, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 244 days.

(21) Appl. No.: 14/431,722

(22) PCT Filed: Jan. 12, 2015

(86) PCT No.: PCT/CN2015/070519
§ 371 (c)(1),
(2) Date: Mar. 26, 2015

(87) PCT Pub. No.: WO2016/106824
PCT Pub. Date: Jul. 7, 2016

(65) Prior Publication Data
US 2016/0363826 A1    Dec. 15, 2016

(30) Foreign Application Priority Data
Dec. 30, 2014 (CN) .......................... 2014 1 0849076

(51) Int. Cl.
*G02F 1/1335* (2006.01)
*G02F 1/1343* (2006.01)
(Continued)

(52) U.S. Cl.
CPC ...... *G02F 1/134336* (2013.01); *G02F 1/1323* (2013.01); *G02F 1/133707* (2013.01);
(Continued)

(58) Field of Classification Search
CPC ............. G02F 1/1323; G02F 1/134363; G02F 1/134336; G02F 1/1333
See application file for complete search history.

(56) References Cited

U.S. PATENT DOCUMENTS 8,830,434 B2* 9/2014 Imayama .......... G02F 1/134363
349/141
8,854,588 B2* 10/2014 Lee .................. G02F 1/134363
349/141
8,953,134 B2* 2/2015 Nomura ............ G02F 1/134363
349/129

* cited by examiner

*Primary Examiner* — Hoan C Nguyen
(74) *Attorney, Agent, or Firm* — Andrew C. Cheng

(57) ABSTRACT

A pixel array structure includes a plurality of pixel zones arranged in an array that defines a row direction and a column direction perpendicular to each other. Each pixel zone includes at least one opening formed therein, which includes first, second, and third opening segments that are sequentially connected to each other. The first opening segment extends from an end of the second opening segment and the third opening segment extends an opposite end of the second opening segment. The extension direction of the third opening segment is opposite to that of the first opening segment. The first and third opening segments have projections on the column direction that are connected to each other and have projections on the row direction that are respectively connected to opposite ends of a projection of the second opening segment on the row direction. Also disclosed is a liquid crystal display panel.

12 Claims, 2 Drawing Sheets

(51) Int. Cl.
*G02F 1/13* (2006.01)
*G02F 1/1337* (2006.01)
(52) U.S. Cl.
CPC .. *G02F 1/133753* (2013.01); *G02F 1/134363* (2013.01); *G02F 2001/134372* (2013.01); *G02F 2201/123* (2013.01)

PIXEL ARRAY STRUCTURE AND LIQUID CRYSTAL DISPLAY PANEL

CROSS REFERENCE TO RELATED APPLICATIONS

This application claims the priority of Chinese Patent Application No. 201410849076.1, entitled "Pixel Array Structure and Liquid Crystal Display Panel", filed on Dec. 30, 2014, the disclosure of which is incorporated herein by reference in its entirety.

BACKGROUND OF THE INVENTION

1. Field of the Invention

The present invention relates to a pixel array structure and a liquid crystal display panel comprising the pixel array structure.

2. The Related Arts

Liquid crystal displaying devices have various advantages, such as light weight, reduced thickness, and low power consumption, which make the liquid crystal displaying device widely used. A liquid crystal displaying device makes use of an electric field established between two electrodes (such as a pixel electrode and a common electrode) to control the direction of liquid crystal in order to display an image. The pixel electrode and the common electrode can be formed on different substrates. However, plane-to-line switching mode liquid crystal panels (such as PLS LCD), which include a pixel electrode and a common electrode formed on the same substrate, have been used more and more commonly for expansion of view angles. However, the color displayed on a PLS liquid crystal panel is varied depending upon the view angles. When a pixel is structured to form multiple domains to handle the color variation issue, patterns of the liquid crystal may be formed in the neighborhood of each domain boundary so as to reduce the brightness and affect the displaying performance and quality.

SUMMARY OF THE INVENTION

The technical solution to be addressed in the present invention is to provide a pixel array structure and a liquid crystal display panel comprising the pixel electrode structure in order to achieve multiple domain displaying and enhance displaying quality.

To achieve the above object, embodiments of the present invention provide the following technical solutions:

A pixel array structure comprises a plurality of pixel zones arranged in an array. The arrangement of the pixel zones defines a row direction and a column direction perpendicular to each other. Each of the pixel zones comprises at least one opening formed therein, wherein the opening comprises a first opening segment, a second opening segment, and a third opening segment that are sequentially connected to each other with the first opening segment extending from an end of the second opening segment and the third opening segment extending an opposite end of the second opening segment and extension direction of the third opening segment being opposite to extension direction of the first opening segment. The first opening segment and the third opening segment have projections on the column direction that are connected to each other. The first opening segment and the third opening segment have projections on the row direction that are respectively connected to opposite ends of a projection of the second opening segment on the row direction.

In the above pixel array structure, two adjacent ones of the pixel zones comprise therebetween a common edge and the openings of the two adjacent ones of the pixel zones are in mirror symmetry with respect to each other about a center line defined by the common edge.

In the above pixel array structure, each of the pixel zones has a rectangular configuration and the opening is connected to one of edges of the pixel zone, while the opening is spaced from remaining three edges of the pixel zone.

In the above pixel array structure, each of the pixel zones comprises two or more than two openings formed therein.

In the above pixel array structure, the two or more than two openings are parallel to each other.

In the above pixel array structure, the second opening segment is in the form of a straight strip and defines an included angel of 45 degrees with respect to the row direction.

The present invention also provides a liquid crystal display panel, which comprises a displaying zone. The displaying comprises therein a pixel array structure. The pixel array structure comprises a plurality of pixel zones arranged in an array. The arrangement of the pixel zones defines a row direction and a column direction perpendicular to each other. Each of the pixel zones comprises at least one opening formed therein, wherein the opening comprises a first opening segment, a second opening segment, and a third opening segment that are sequentially connected to each other with the first opening segment extending from an end of the second opening segment and the third opening segment extending an opposite end of the second opening segment and extension direction of the third opening segment being opposite to extension direction of the first opening segment. The first opening segment and the third opening segment have projections on the column direction that are connected to each other. The first opening segment and the third opening segment have projections on the row direction that are respectively connected to opposite ends of a projection of the second opening segment on the row direction.

In the above liquid crystal display panel, two adjacent ones of the pixel zones comprise therebetween a common edge and the openings of the two adjacent ones of the pixel zones are in mirror symmetry with respect to each other about a center line defined by the common edge.

In the above liquid crystal display panel, each of the pixel zones has a rectangular configuration and the opening is connected to one of edges of the pixel zone, while the opening is spaced from remaining three edges of the pixel zone.

In the above liquid crystal display panel, each of the pixel zones comprises two or more than two openings formed therein.

In the above liquid crystal display panel, the two or more than two openings are parallel to each other.

In the above liquid crystal display panel, the second opening segment is in the form of a straight strip and defines an included angel of 45 degrees with respect to the row direction.

The present invention provides an arrangement of an opening in each pixel zone, which is that the opening comprises a first opening segment, a second opening segment, and a third opening segment that are sequentially connected to and in communication with each other and the first opening segment extends from one end of the second opening segment and the third opening segment extends from an opposite end of the second opening segment so as to have liquid crystal in the pixel zone orientated differently to allow each pixel zone to form therein a plurality of domains to help prevent a viewer from observing variation of color resulting from change of view angle thereby enhancing the displaying quality of the liquid crystal display panel and improving image quality.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution proposed in an embodiment of the present invention with reference to the attached drawings of the embodiment of the present invention.

The present invention provides a liquid crystal display panel, which is applicable to IPS (In-Plane Switching) mode liquid crystal display screens of various sizes. The liquid crystal display panel comprises a displaying zone and the displaying zone includes a pixel array structure formed therein. A specific description of the pixel array structure will be given as follows.

Figure 1:
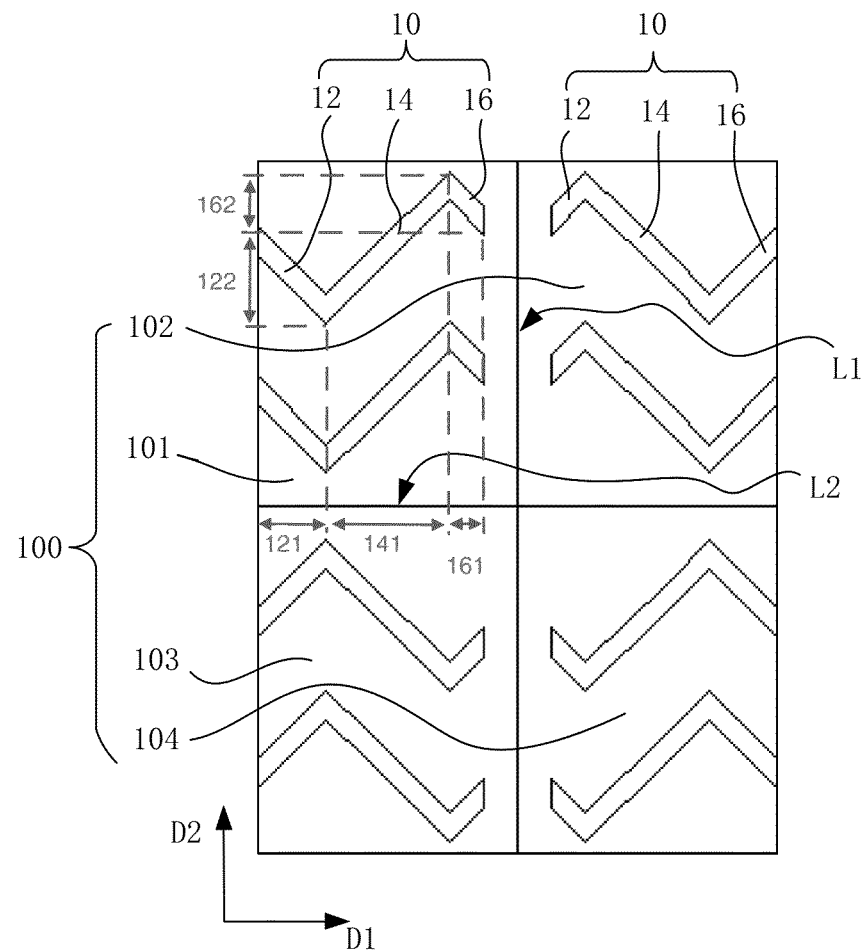
FIG. 1 is a schematic view illustrating a pixel array structure according to an embodiment of the present invention.

Referring to FIG. 1, a pixel array structure comprises a plurality of pixel zones 100 arranged in an array. The arrangement of the pixel zones 100 defines a row direction D1 and a column direction D2 that are perpendicular to each other. FIG. 1 shows two rows and two columns of the pixel zones 100 as an example for illustration. Each of the pixel zones 100 comprises at least one opening 10 formed therein. In the instant embodiment, each of the pixel zones 100 comprises a number of openings 10, which is two or more than two. The two or more than two openings 10 are arranged parallel to each other and adjacent ones of the openings 10 are spaced from each other. The two or more than two openings 10 can be arranged to distribute in a one-by-one fashion in the column direction D2 or alternatively, they can be arranged as sloping steps distributed in a one-by-one manner.

In the instant embodiment, each of the pixel zones 100 has configuration that is rectangular. The openings 10 are connected to one of edges of the pixel zone 100 and the openings 10 are spaced from remaining three edges of the pixel zone 100, meaning they being in a condition of disconnection from each other.

Two adjacent ones of the pixel zones 100 comprise therebetween a common edge and the openings 10 of the two adjacent ones of the pixel zones 100 are in mirror symmetry with respect to each other about a center line defined by the common edge. As shown in FIG. 1, the pixel zones 100 includes a first pixel zone 101, a second pixel zone 102, a third pixel zone 103, and a fourth pixel zone 104. The first pixel zone 101 and the second pixel zone 102 comprise therebetween a first common edge L1 and the first pixel zone 101 and the third pixel zone 103 comprise therebetween a second common edge L2. The first common edge L1 is perpendicular to the second common edge L2. The openings 10 of the first pixel zone 101 are not connected with the openings 10 of the second pixel zone 102. The openings 10 of the first pixel zone 101 and the openings 10 of the second pixel zone 102 are in mirror symmetry with respect to each other about a center line defined by the first common edge L1. The openings 10 of the first pixel zone 101 and the openings 10 of the third pixel zone 103 are in mirror symmetry with respect to each other about a center line defined by the second common edge L2.

The openings 10 each comprise a first opening segment 12, a second opening segment 14, and a third opening segment 16 that are sequentially connected to and in communication with each other. The first opening segment 12 extends perpendicularly from an end of the second opening segment 14 and the third opening segment 16 extends perpendicularly from an opposite end of the second opening segment 14 and the third opening segment 16 extends in an extension direction that is opposite to an extension direction in which the first opening segment 12 extends. The first opening segment 12 and the third opening segment 16 have projections (respectively designated at 122, 162) on the column direction D2, wherein the projections 122, 126 are respectively imaginary line segments on the column direction D2 (or an axis parallel to the column direction D2) that are respectively consistent with the first opening segment 12 and the third opening segment 16 when viewed in a direction substantially perpendicular to the column direction D2 and the projections 122, 162 are in the form of line segments that are connected to each other in the column direction D2; and the first opening segment 12 and the third opening segment 16 have projections (respectively designated at 121, 161) on the row direction D1 that are respectively connected to two ends of a projection (designated at 141) of the second opening segment 14 on the row direction D1, wherein the projections 121, 141, 161 of the first, second, and third opening segments 12, 14, 16 are respectively imagery line segments on the row direction D1 (or an axis parallel to the row direction D1) that are respectively consistent with the first, second, and third opening segments 12, 14, 16 when viewed in a direction substantially perpendicular to the row direction D1 and the projections 121, 141, 161 are in the form of line segments that are successively connected to each other in the row direction D1.

Specifically, the second opening segment 14 is in the form of a straight strip that defines an included angle of 45 degrees with respect to the row direction. The first opening segment 12 and the third opening segment 16 are also in the form of a straight strip.

Figure 2:
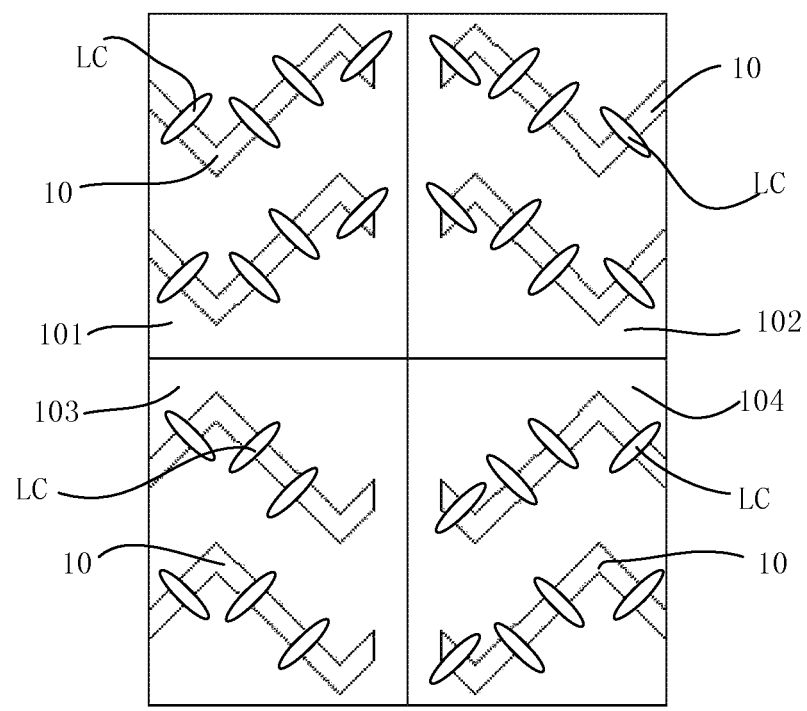
FIG. 2 is a schematic view illustrating distribution of liquid crystal in the pixel array structure according to the embodiment of the present invention.

The arrangement of the openings 10 is to control the orientation of liquid crystal molecules within the pixel zone. As shown in FIG. 2, upon application of a voltage to each pixel electrode, the orientations of the liquid crystal molecules LC in two adjacent pixel zones are different. For each specific one of the pixel zones 100, the liquid crystal molecules LC located in the first opening segment 12, the liquid crystal molecules LC located in the second opening segment 12, and the liquid crystal molecules LC located in the third opening segment 16 are of orientations that are different. This achieves formation of multiple domains, allowing the liquid crystal display panel to achieve displaying in multiple view angles.

The present invention provides an arrangement of an opening 10 in each pixel zone 100, which is that the opening 10 comprises a first opening segment 12, a second opening segment 14, and a third opening segment 16 that are sequentially connected to and in communication with each other and the first opening segment 12 extends from one end of the second opening segment 14 and the third opening segment 16 extends from an opposite end of the second opening segment 14 so as to have liquid crystal LC in the pixel zone 100 orientated differently to allow each pixel zone 100 to form therein a plurality of domains to help prevent a viewer from observing variation of color resulting from change of view angle thereby enhancing the displaying quality of the liquid crystal display panel and improving image quality.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A pixel array structure, comprising a plurality of pixel zones arranged in an array, the arrangement of the pixel zones defining a row direction and a column direction perpendicular to each other, each of the pixel zones comprising at least one opening formed therein, wherein the opening comprises a first opening segment, a second opening segment, and a third opening segment that are sequentially connected to each other with the first opening segment extending from an end of the second opening segment and the third opening segment extending an opposite end of the second opening segment and extension direction of the third opening segment being opposite to extension direction of the first opening segment, the first opening segment and the third opening segment having projections on the column direction that are connected to each other, the first opening segment and the third opening segment having projections on the row direction that are respectively connected to opposite ends of a projection of the second opening segment on the row direction;

wherein the projections of the first and third opening segments on the column direction are imaginary line segments on the column direction that are respectively consistent with the first and third opening segments when viewed in a direction substantially perpendicular to the column direction and wherein the projections of the first, second, and third opening segments on the row direction are imaginary line segments on the row direction that are respectively consistent with the first, second, and third opening segments when viewed in a direction substantially perpendicular to the row direction.

2. The pixel array structure as claimed in claim 1, wherein two adjacent ones of the pixel zones comprise therebetween a common edge and the openings of the two adjacent ones of the pixel zones are in mirror symmetry with respect to each other about a center line defined by the common edge.

3. The pixel array structure as claimed in claim 1, wherein each of the pixel zones has a rectangular configuration and the opening is connected to one of edges of the pixel zone, while the opening is spaced from remaining three edges of the pixel zone.

4. The pixel array structure as claimed in claim 1, wherein each of the pixel zones comprises two or more than two openings formed therein.

5. The pixel array structure as claimed in claim 4, wherein the two or more than two openings are parallel to each other.

6. The pixel array structure as claimed in claim 1, wherein the second opening segment is in the form of a straight strip and defines an included angel of 45 degrees with respect to the row direction.

7. A liquid crystal display panel, comprising a displaying zone, the displaying comprising therein a pixel array structure, the pixel array structure comprising a plurality of pixel zones arranged in an array, the arrangement of the pixel zones defining a row direction and a column direction perpendicular to each other, each of the pixel zones comprising at least one opening formed therein, wherein the opening comprises a first opening segment, a second opening segment, and a third opening segment that are sequentially connected to each other with the first opening segment extending from an end of the second opening segment and the third opening segment extending an opposite end of the second opening segment and extension direction of the third opening segment being opposite to extension direction of the first opening segment, the first opening segment and the third opening segment having projections on the column direction that are connected to each other, the first opening segment and the third opening segment having projections on the row direction that are respectively connected to opposite ends of a projection of the second opening segment on the row direction;

wherein the projections of the first and third opening segments on the column direction are imaginary line segments on the column direction that are respectively consistent with the first and third opening segments when viewed in a direction substantially perpendicular to the column direction and wherein the projections of the first, second, and third opening segments on the row direction are imaginary line segments on the row direction that are respectively consistent with the first, second, and third opening segments when viewed in a direction substantially perpendicular to the row direction.

8. The liquid crystal display panel as claimed in claim 7, wherein two adjacent ones of the pixel zones comprise therebetween a common edge and the openings of the two adjacent ones of the pixel zones are in mirror symmetry with respect to each other about a center line defined by the common edge.

9. The liquid crystal display panel as claimed in claim 7, wherein each of the pixel zones has a rectangular configuration and the opening is connected to one of edges of the pixel zone, while the opening is spaced from remaining three edges of the pixel zone.

10. The liquid crystal display panel as claimed in claim 7, wherein each of the pixel zones comprises two or more than two openings formed therein.

11. The liquid crystal display panel as claimed in claim 10, wherein the two or more than two openings are parallel to each other.

12. The liquid crystal display panel as claimed in claim 7, wherein the second opening segment is in the form of a straight strip and defines an included angel of 45 degrees with respect to the row direction.

* * * * *